Patented June 12, 1934

1,962,476

UNITED STATES PATENT OFFICE 1,962,476

OPTICALLY ACTIVE ARYLACETYLCARBINOLS AND PROCESS OF PREPARING THEM

Max Bockmühl, Leonhard Stein, and Gustav Ehrhart, Frankfort-on-the-Main, Germany, assignors to Winthrop Chemical Company, Inc., New York, N. Y., a corporation of New York No Drawing. Application September 4, 1931, Serial No. 561,302. In Germany September 8, 1930

9 Claims. (Cl. 260—131)

The present invention relates to optically active arylacetylcarbinols, more particularly to compounds of the following general formula

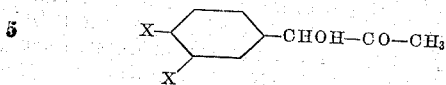

wherein one X stands for hydroxy or benzyloxy, the other X being hydrogen or methoxy, and to a process of preparing them.

We have found that optically active compounds of the above constitution are obtained by subjecting carbohydrates to a fermentation process by means of yeast in the presence of compounds of the following general formula

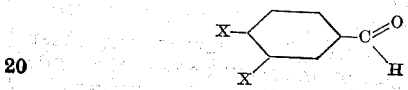

wherein one X stands for hydroxy, acyloxy or benzyloxy, the other X for hydrogen or methoxy.

The process may be carried out by dissolving a carbohydrate, for instance grape sugar, in water and adding yeast; after some time, during which the fermentation process is initiated, the aldehyde, preferably dissolved in water, is added, while stirring, to the fermenting solution. During the fermentation process the aldehyde is transformed into the optically active acetylcarbinol, probably by the action of the carboligase contained in the yeast. The solution is separated from the yeast, e. g. by filtering or allowing the yeast to form a layer and siphoning off the solution from the layer. From the solution thus obtained the optically active acetylcarbinol is separated according to known methods. The acyl- or benzyl-groups then can easily be split off.

By starting from the acylated hydroxy-benzaldehydes it is sometimes not necessary to split off the acyl group after the fermentation from the keto-alcohols produced because it has already been split off during the fermentation. When hydroxy-aromatic aldehydes are used as parent material, the nuclear hydroxyl hydrogen atoms of which have been exchanged for a benzyl group, the benzyl group can be split off after the fermentation or after the further treatment of the etherified arylacetylcarbinols.

The new compounds are useful in the synthesis of remedies.

The following examples serve to illustrate the invention, but they are not intended to limit it thereto.

(1) 400 grams of grape sugar are dissolved in 12 liters of water, the solution is stirred with 500 grams of yeast and the whole is fermented for about 15 minutes. 62 grams of meta-acetylhydroxybenzaldehyde of the following formula:

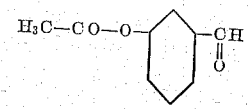

are then introduced drop by drop, while vigorously stirring. After the liquid has been allowed to stand for about 3 days at room temperature, the yeast is filtered and the filtrate obtained is salted out with sodium chloride. The levo-meta-hydroxyphenylacetylcarbinol is removed from the liquid by extraction with ether. A crystalline mass remains on evaporation of the ether which is recrystallized from very dilute alcohol. The compound is obtained in the form of large clear crystals melting at 125° C.–126° C. The levo-meta-hydroxyphenylacetylcarbinol has a specific rotation of $$[\alpha]_D^{20} = -177.5°.$$

(2) 5.6 kilos of grape sugar are dissolved in 150 liters of water at 25° C., the solution is fermented for about 15 minutes with 12 kilos of yeast and mixed in the course of 1 hour with a solution of 1200 grams of meta-hydroxybenzaldehyde in 50 liters of water. After stirring for several hours, the whole is allowed to stand overnight so that the yeast can deposit and the clear liquid is then siphoned off. It is then salted out with a sufficient quantity of sodium chloride and extracted with ethyl acetate. The residue obtained after distillation of the ethyl acetate is mixed with an equal quantity of ether and allowed to stand in a freezing mixture for several hours, whereby the levo-meta-hydroxy-phenyl-acetylcarbinol crystallizes. It melts at 125° C.–126° C. and has a specific rotation of $$[\alpha]_D^{20} = -177.5°.$$

(3) 1400 grams of grape sugar are dissolved in 50 liters of water and the solution is fermented at room temperature with 2.5 kilos of yeast. 200 grams of meta-benzyloxy-benzaldehyde are added in the course of 1 hour, while vigorously stirring, and stirring is continued for several hours. After 2 days the yeast is removed by filtration and the filtrate is salted out with sodium chloride. The levo-meta-benzyloxyphenylacetylcarbinol is removed from the liquid by extraction with ethyl acetate and is obtained after purification by way of its bisulfite compound, in the form of a feebly yellowish oil boiling at 195° C. under 3.5 mm. pressure.

(4) 1500 grams of grape sugar are dissolved in 30 liters of water at about 18° C., the solution is mixed with 2 kilos of yeast and fermented for about 15 minutes. A solution of 200 grams of isovanillin in 12 liters of hot water is then added drop by drop in the course of 2 hours. After the liquid has been allowed to ferment for 2 days the yeast is removed by filtering and the filtrate is salted out with sodium chloride and extracted with ethyl acetate. After distillation of the extract, 190 grams of a residue are obtained having a specific rotation of $$[\alpha]_D^{20} = -35°.$$

This residue is then diluted with ether and shaken with a sodium bisulfite solution of 40 per cent. strength. The ethereal layer is then separated and the remaining bisulfite solution is diluted with water and then mixed with an excess of sodium bicarbonate. The liquid is then extracted with ethyl acetate and the ethyl acetate solution is dried by means of anhydrous sodium sulfate. The solvent is distilled and the residue is subjected to distillation under reduced pressure, in order to purify it completely. The levo-3-hydroxy-4-methoxyphenylacetyl-carbinol is obtained which distils at 135° C.–140° C. under 3.5 mm. pressure. It has a specific rotation of $$[\alpha]_D^{20} = -120°.$$

(5) 12 kilos of molasses are dissolved in 150 liters of water at 18° C., the solution is fermented for 15 minutes with 12 kilos of yeast and mixed in the course of 1 hour with a solution of 1200 grams of meta-hydroxybenzaldehyde in 50 liters of water said solution having a temperature of 50° C. The final temperature of the fermentation mixture is 28° C.–30° C. After stirring for several hours, the whole is allowed to stand overnight so that the yeast can deposit and the clear liquid is siphoned off the following day. It is then salted out with a sufficient quantity of sodium chloride and extracted with ethyl acetate. The residue obtained after distillation of the ethyl acetate is mixed with double to three times the quantity of ether and allowed to stand in a freezing mixture for several hours. The nearly pure levo-meta-hydroxyphenylacetylcarbinol crystallizes from the solution with a yield of at least 450 grams. It has a specific rotation of $$[\alpha]_D^{20} = -177.5°.$$

and melts at 125° C.–126° C.

We claim:
1. The process of preparing optically active arylacetylcarbinols which consists in subjecting an aqueous solution of carbohydrates by means of yeast to a fermentation process in the presence of a compound of the following general formula

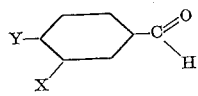

wherein one X stands for acetyloxy or benzyloxy, the other X being hydrogen or one X stands for hydroxy, the other X being methoxy or hydrogen.

2. The process of preparing optically active arylacetylcarbinols which consists in subjecting an aqueous solution of carbohydrates by means of yeast to a fermentation process in the presence of a compound of the following general formula

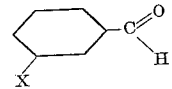

wherein X stands for acetyloxy or benzyloxy and Y stands for hydrogen or X stands for hydroxy and Y stands for methoxy or hydrogen.

3. The process of preparing levo-arylacetylcarbinols which consists in subjecting an aqueous solution of grape sugar by means of yeast to a fermentation process in the presence of a compound of the following general formula

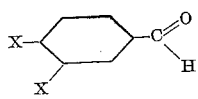

wherein X stands for hydroxy or acetyloxy.

4. The process of preparing levo-meta-hydroxyphenyl-acetylcarbinol which consists in subjecting an aqueous solution of grape sugar by means of yeast to a fermentation process in the presence of meta-hydroxybenzaldehyde.

5. The process of preparing levo-meta-hydroxyphenyl-acetylcarbinol which consists in subjecting an aqueous solution of grape sugar by means of yeast to a fermentation process in the presence of meta-acetyloxybenzaldehyde.

6. The optically active compounds of the following general formula

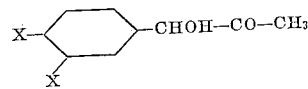

wherein one X stands for hydroxy, the other X being hydrogen or methoxy or one X stands for benzyloxy, the other X being hydrogen.

7. The optically active compounds of the following general formula

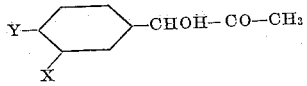

wherein X stands for hydroxy and Y stands for hydrogen or methoxy or X stands for benzyloxy and Y stands for hydrogen.

8. The levo-meta-hydroxyphenyl-acetylcarbinol of the following formula

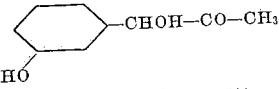

forming large clear crystals, melting at 125° C.–126° C. and having a specific rotation of $$[\alpha]_D^{20} = -177.5°.$$

9. The levo-3-hydroxy-4-methoxy-phenyl-acetylcarbinol of the following formula

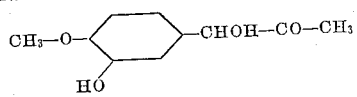

boiling at 135° C.–140° C. under a pressure of 3.5 mm. and having a specific rotation of $$[\alpha]_D^{20} = -120°.$$

MAX BOCKMÜHL.
LEONHARD STEIN.
GUSTAV EHRHART.